LYLE O. HOPPIE
INVENTOR.

BY Alden D. Redfield
Melvin E. Frederick
ATTORNEYS

Aug. 30, 1966 L. O. HOPPIE 3,270,304
FORM FOR SUPPORTING SADDLE-SHAPED ELECTRICAL COILS
Filed Nov. 1, 1963 2 Sheets-Sheet 2

LYLE O. HOPPIE
*INVENTOR.*

BY Alden D. Redfield
Melvin E. Frederick
ATTORNEYS

United States Patent Office 3,270,304
Patented August 30, 1966

3,270,304
FORM FOR SUPPORTING SADDLE-SHAPED ELECTRICAL COILS
Lyle O. Hoppie, Watertown, Mass., assignor to Avco Corporation, Cincinnati, Ohio, a corporation of Delaware
Filed Nov. 1, 1963, Ser. No. 320,911
10 Claims. (Cl. 335—216)

The present invention relates generally to electrically conductive windings and particularly to a form for supporting saddle-shaped electrical coils wound from strip-like material.

In order to facilitate understanding and appreciation of the advantages and novelty of the present invention, a brief discussion of the design and construction of superconductive magnets at this point will be helpful.

The amount of energy stored in some proposed large superconducting magnets is measured in tens of megajoules. If a magnet storing such tremendous energy becomes normal in an uncontrolled manner, complete destruction of the magnet, as well as its immediate surroundings, is quite likely to result. It is therefore essential that such magnets be fail-safe, i.e., that there be provided protective circuitry to protect such superconducting magnets in the event that they become normal. High field-strength superconducting magnets may be provided with fail-safe features, as disclosed in patent application Serial No. 220,237, filed August 27, 1962. One feature comprises providing inductive shields around segments or preferably layers of the coil which tend to maintain the total magnetic flux constant thereby permitting the current in the coil to decay slowly with a minimum energy deposited in the superconducting windings.

As disclosed in the aforementioned patent application, it is desirable, for purposes of protecting superconductive coils, to provide inductive shields, formed of strips of low resistance, nonmagnetic material, for example, between layers of the superconducting coil to act as inductive shields to minimize the energy dissipated in the coil itself. Stating it another way, the inductive shields inhibit increases in the flow of current in the coil due to inductive coupling during transients. The inductive shield takes up most of the current increase previously required of the layer adjacent a normal region and therefore stops an accumulative and inductive propagation of the normal region.

The provision of such inductive shields between the layers of a coil imposes the most severe constraint in the manufacture of superconductive magnets having a saddle-shaped configuration. The use of conventional winding techniques in the fabrication of saddle-shaped coils from wire results in a scrambled or random location of the wires which not only results in a poor packing factor, but in the case of the superconducting coils, renders it impossible to provide protective inductive circuitry of the type described above.

While wire can assume bends in double curvature, such is not the case for a strip or flat wire. A strip of material has a preferred axis to bending and accordingly, if it is bent against its high moment of inertia axis, it will buckle and lead to a poor packing factor in the manufacture of electrical coils. Thus, while wire can be successfully wound in a saddle-shaped form on a cylinder, strip material cannot be so manipulated because the strip would have to assume double curvature to follow the cylindrical contour. For strip-like material to be wound in the same manner as the wire, the strip would have to be segmented into many pieces to limit the bends to essentially single curvature. Such an approach is not, to say the least, an attractive one.

A superconducting coil containing protective inductive circuitry can be constructed from wire wound into pancakes. The pancakes are generally wound in a rectangular configuration and then bent to the saddle shape. The bending is accomplished by either bending the pancake along its axis in the length direction or bending the short sides of the pancakes at right angles to the long sides. The protective circuitry material is interposed between the pancakes. This so-called pancake approach, while feasible, suffers from several limitations which render it unsatisfactory. For example, each pancake is a separate coil and therefore a superconducting contact is required for each pancake and since each pancake must be of a different size, complex and expensive jigging forms are required. Further, this approach cannot be easily extrapolated to large coils. A further disadvantage is that the protective circuit material must be in the form of separate sheets with the center removed since continuous strip material cannot be incorporated in such a geometry.

With the foregoing in mind, it will be readily evident that saddle-shaped superconducting coils should have a high packing factor and be amenable to a simple and economical method of manufacture which permits the incorporation of protective circuitry. Patent application Serial No. 297,649, filed July 25, 1963, discloses a winding for superconductive coils that permits the incorporation of protective circuitry. The disclosed winding comprises the provision of a plurality of turns of a superconductive conductor contiguously and fixedly aligned with respect to each other to form a flexible endless winding with a strip of low resistance and non-magnetic material carried by a flat surface of the endless winding. Where more than one spool of superconducting wire is required to form the endless winding (satisfactory superconductors in strip form and of indefinite length have not as yet been developed), the end portions of the first wire and the beginning and end of all succeeding wires are disposed in a predetermined region of the endless winding. Upon completion of the winding, a cylindrical coil may be simply formed by winding it on a cylindrical form, beginning preferably at a point on the winding such that the aforementioned region containing the end portions of the wire or wires is located in an exposed surface of the winding. Preferably, the winding is provided with one 360° twist for every layer of the coil. Thus, when the coil is completed, there will be no net twists in the portion of the winding which connects the first and last layers of the coil and crosses over the remaining layers of the coil. Further, this crossover portion of the winding preferably contains the end portions of the wire or wires forming the belt.

The present invention is directed to a geometry that allows the aforementioned endless belt to be wound to form a saddle-shaped coil having a high packing factor and amenable to a simple and economical method of manufacture which permits the incorporation of protective circuitry.

Attention is directed to the important fact that an untwisted endless belt as disclosed in patent application Serial No. 297,649 defines a flexible and unrestrained cylinder having a circumference large with respect to its length, i.e., a layer of wire circumferentially wound on a conventional cylindrical form. The present invention is based on the fact that if one twists diametrically opposite portions of the cylinder in diametrically opposite radial directions, the surface defined by the coil will have bends only in single curvature, thereby providing a form on which further layers of strip can subsequently be wound without buckling since the circumference of this surface is constant along lines at any given and constant distance in the width direction from a peripheral edge of the surface.

With the foregoing in mind, it will be readily evident that the present invention permits the construction of a saddle-shaped superconducting coil having such desirable characteristics as a high packing factor and which is amenable to a simple and economical method of manufacture which permits the incorporation of protective circuitry.

The invention, both as to its organization and method of operation, will best be understood from the following description of the specific embodiment when read in conjunction with the complete drawings, in which:

FIGURES 1 and 2 illustrate the basic concept of the present invention.

Figure 1:
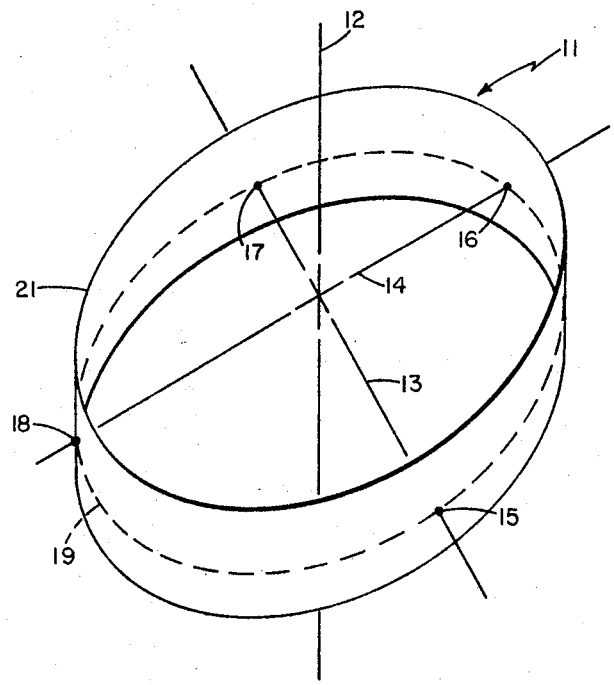
FIGURE 1 is a pictorial representation of a cylindrical member.

Referring now to FIGURE 1, the short cylindrical member 11 shown in this figure for purposes of describing the basic concepts of the present invention can be considered as an integral and thin-walled strip-like member comprising a layer of wire that has been wound on a conventional cylindrical form. For purposes of discussion, the member 11 is illustrated as cylindrical and concentric about a longitudinal axis 12. Mutually orthogonal axes 13 and 14, which are also orthogonal to the longitudinal axis 12, intercept the member 11 at four equally spaced points 15, 16, 17 and 18. The succession of these points, for example in a counter clockwise direction, defines a positive direction of a circumference which intercepts them. This circumference is designated by the broken line 19. The aforementioned axes, points, and circumference are also shown on member 11 in FIGURE 2 for reference purposes.

Figure 2:
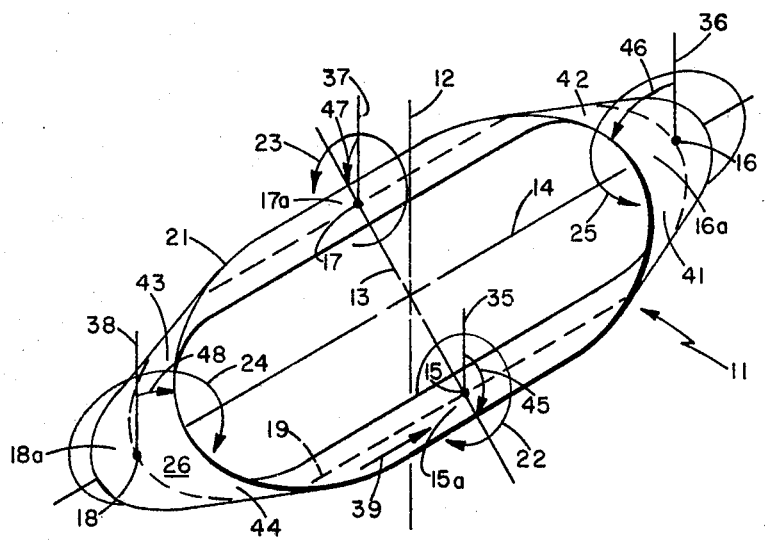
FIGURE 2 is a pictorial representation of the member of FIGURE 1 manipulated to define a surface in accordance with the present invention.

Assuming now that member 11 as shown in FIGURE 1 is unrestrained, if one twists the upper periphery 21 of diametrically opposite portions containing two points, such as for example points 15 and 17, in diametrically opposite radial directions, which is to say away from each other as indicated by arrows 22 and 23 in FIGURE 2, the member 11 of FIGURE 1 will assume a shape substantially as shown in FIGURE 2. The same result can of course be achieved by twisting the upper periphery 21 of diametrically opposite portions containing points 16 and 18, toward each other as indicated by arrows 24 and 25. Accordingly, the necessary result is achieved if diametrically opposite portions are rotated in diametrically opposite directions whether the direction of rotation is toward or away from the longitudinal axis 12. It is significant that the bends in the member 11, as shown in FIGURE 2, are in substantially only single curvature. Further, since the circumference of the member 11 of FIGURE 2 is constant along lines at any given and constant distance in the width direction from, for example, peripheral edge 21 of the member, strip-like material may be wound on the outer surface of the member without buckling and each layer will be in abutting relationship at substantially all points with the layers adjacent thereto, thereby providing the highest possible packing factor.

Referring now to FIGURE 2, the outer surface 26 of the member 11 is the supporting surface and of course is annular and closed on itself. The points 15 and 17 lie in a plane which includes axes 12 and 13 and points 16 and 18 lie in a plane which includes axes 12 and 14. Accordingly, these points are equally spaced one from another and their succession defines a positive direction of the circumference. It is to be further noted that in FIGURE 2, the longitudinal axis 12 is surrounded by the circumference 19 and although the configuration of the member 11 in FIGURE 2 no longer defines a right cylinder as is shown in FIGURE 1, the lines 35, 36, 37 and 38, which pass through respectively points 15, 16, 17 and 18, are parallel to the longitudinal axis 12. Further, since the longitudinal axis 12 is centrally located, any given point on the longitudinal axis is equidistant from points 15 and 17 and also equidistant from points 16 and 18 as shown in FIGURE 2.

Directing attention particularly now to FIGURE 2, the position of the portions of the member designated respectively 15a, 16a, 17a and 18a, containing respectively points 15, 16, 17 and 18, may be identified by using as a reference the above-defined circumference 19 and its positive direction and lines 35, 36, 37 and 38, which are parallel to the longitudinal axis 12 and which respectively pass through each point. The positive direction of the circumference is designated by the arrow 39. Thus, the portion 15a of the member or surface of the member containing point 15 is disposed at an angle from line 35 measured in a clockwise direction about the circumference 19 as viewed in its positive direction 39; the portion 16a containing point 16 is disposed at an angle from line 36 as measured in a counter clockwise direction about the circumference 19 as viewed in its positive direction 39; the portion 17a containing point 17 is disposed at an angle from line 37 as measured in a closkwise direction about the circumference 19 as viewed in its positive direction 39; and the portion 18a containing point 18 is disposed at an angle from line 38 as measured in a counter clockwise direction about the circumference 19 as viewed in its positive direction 39. Further, portions 41, 42, 43 and 44, having bends substantially only in single curvature, are disposed between and connect respectively the aforementioned portions 15a, 16a, 17a and 18a. The aforementioned angles are designated respectively by the arrows 45, 46, 47 and 48 beginning respectively at the aforementioned lines and terminating at the periphery 21 of the member 11. The points of termination of arrows 45, 47, and 46, 48 lie in planes which include the longitudinal axis 12 and respectively axes 13 and 14.

The variations in a supporting surface in accordance with the present invention are almost without limit. This can be most simply and vividly demonstrated by making a cylinder as shown in FIGURE 1 from a strip of paper and twisting it in a manner previously described. When this is done, it will be readily seen that diametrically opposite portions may be twisted a full 180°, diametrically opposite portions may be moved toward and away from each other, and the distance between these portions may be varied from a maximum distance to zero and/or made parallel or nonparallel to each other, diametrically opposite portions 15a and 17a, for example, may lie in the same plane or be curved, and diametrically opposite portions 16a and 18a, for example, may be flat or curved. Further, portions 41–43 either severally or collectively may have a generally conical, cylindrical, elliptical, parabolic, or similar configuration. However, in every case, a winding of strip-like material can be wound on the form without buckling for the reason that the circumference is constant along lines at any given and constant distance in the width direction from a peripheral edge of the form.

Figure 3:
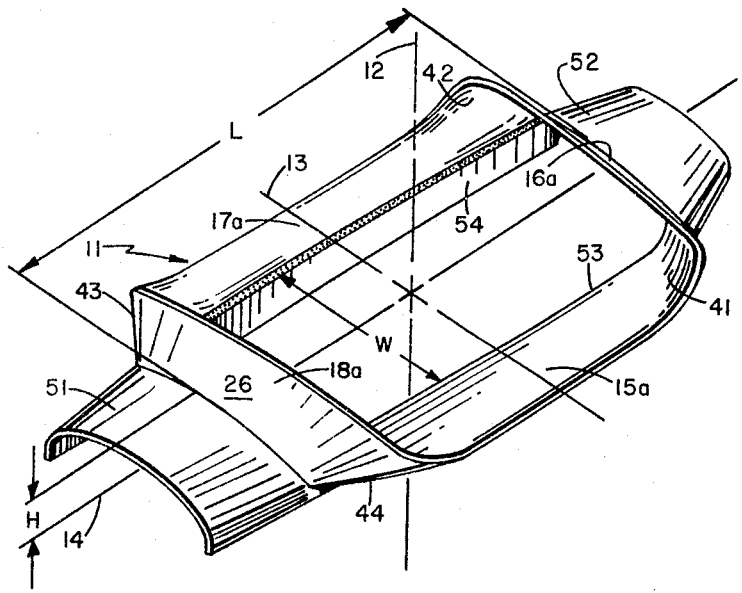
FIGURE 3 is a perspective view of a form for supporting a saddle-shaped electrical coil in accordance with the present invention.

FIGURE 3 shows a form in accordance with the present invention as actually reduced to practice. The portions 15a and 17a lie in the same plane and portions 16a and 18a are flat. The further portions 41, 42, 43 and 44 have a generally conical configuration. However, all of the portions or such of the portions which are bent have bends in substantially only single curvature. Extensions 51 and 52 which extend essentially in the direction of axis 14, said extensions 53 and 54 which extend essentially in the direction of the longitudinal axis 12, facilitate the winding of the coil and lend additional rigidity to the form. The form is preferably comprised of copper to permit it to additionally function as an inductive shield.

Figure 4:
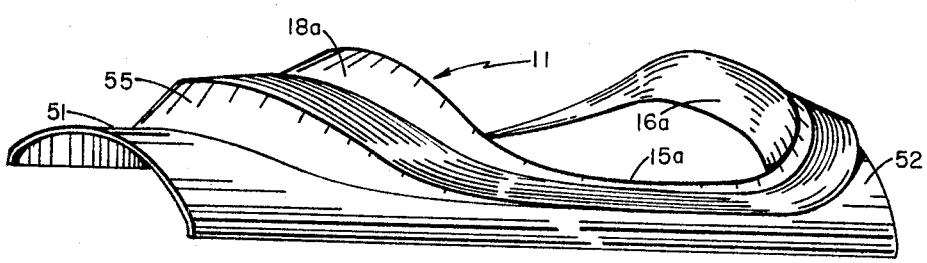
FIGURE 4 shows a winding of strip-like material wound on the form of FIGURE 3.

FIGURE 4 shows a coil comprised of strip-like material 55 wound on the form illustrated in FIGURE 3.

Since there are many different shapes which will satisfy the general configuration described hereinabove, a supporting surface in accordance with the present invention may, depending on several factors the most important of which is the complexity of the shape selected, be provided by the use of casting, molding, and/or machining techniques, or by fabricating the surface in sections.

One shape, as shown in FIGURE 3, which has been fabricated and which is adaptable both to conventional design calculation and fabricating techniques is comprised of four sections formed on a conical surface and subsequently joined together to form a unitary member. In this case, and referring now to FIGURE 3, each of the four sections, defined essentially by the axes 13 and 14, is formed individually by bending flat straight strips of material, such as for example copper, around a suitable conical form, cutting the strips to a predetermined length and then welding them together to form an annular surface having the required configuration in accordance with the present invention. The sections which include portions 41 and 43 are for all practical purposes identical. The sections which include portions 42 and 44 are also identical for all practical purposes but have a direction of curvature opposite to that of the sections which include portions 41 and 43, i.e., two of the sections are right-handed and two of the sections are left-handed.

Subject to the limitations imposed by inter alia, the required distance W between portions 15a and 17a, the length L of the form, and the height H of each portion 16a and 18a, an included angle for the conical form (not shown) is selected which will require the least amount of wire to produce the required magnetic field over the required volume.

On the basis of conventional geometrical considerations, the orientation of the conical form with respect to the axis 14 may now be selected which will provide a supporting surface that closes on itself, provides the required crossover height H in the direction of axis 12, separation W in the direction of axis 13, and length L in the direction of axis 14. Two right-hand and two left-hand sections may now be bent around the conical form at the proper location thereon, cut to the required length and finally welded together to provide a member 11 substantially as shown in FIGURE 3. If they are deemed necessary or desirable, extensions 51–54 or the like are then formed and welded to the member 11.

Thus, although the supporting surface 26 of FIGURE 3 is actually fabricated in sections, it is substantially defined by the outermost surface of a cylinder developed by twisting diametrically opposite portions of the cylinder in opposite radial directions. Accordingly, the circumference of surface 26 is constant along lines at any given and constant distance in the width direction from a peripheral edge of the surface and has bends substantially only in single curvature.

The various features and advantages of the embodiments disclosed are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A substantially smooth strip of material for supporting a saddle-shaped electrical coil,
   (a) said strip being closed on itself, having a length large with respect to its width, and having bends in substantially only single curvature;
   (b) said strip having first, second, third and fourth portions respectively extending across its width, said portions being successively and equally spaced one from another; and
   (c) said first and third portions being inclined toward one another and disposed at least in part above said second and fourth portions when viewed from a first direction along a line surrounded by said strip and substantially equally spaced from said first and third portions and said second and fourth portions.

2. A substantially smooth strip of material for supporting a saddle-shaped electrical coil,
   (a) said strip being closed on itself, having a length large with respect to its width, and having bends in substantially only single curvature;
   (b) said strip having first, second, third and fourth portions respectively extending across its width, said portions being successively and equally spaced one from another; and
   (c) said first and third portions being both inclined and generally curved toward one another and disposed at least in part above said second and fourth portions when viewed from a first direction along a line surrounded by said strip and substantially equally spaced from said first and third portions and said second and fourth portions whereby a continuous strip-like conductor having substantially straight edges may be disposed on said strip with bends in substantially only single curvature.

3. A form for supporting a saddle-shaped electrical coil comprising:
   (a) an annular supporting surface closed on itself and having a circumference large with respect to its width, said circumference being constant along lines at any given and constant distance in the width direction from a peripheral edge of said surface;
   (b) first, second, third, and fourth points successively and substantially equally spaced one from another along a circumference, the succession of said points defining a positive direction of said circumference, said supporting surface having a longitudinal axis surrounded by said circumference;
   (c) a portion of said surface containing said first point being disposed at an angle from a line parallel to said longitudinal axis and passing through said first point, said angle being measured in a clockwise direction about said circumference as viewed in said positive direction;
   (d) a portion of said surface containing said second point being disposed at an angle from a line parallel to said longitudinal axis and passing through said second point, said angle being measured in a counter clockwise direction about said circumference as viewed in said positive direction;
   (e) a portion of said surface containing said third point being disposed at an angle from a line parallel to said longitudinal axis and passing through said third point, said angle being measured in a clockwise direction about said circumference as viewed in said positive direction; and
   (f) a portion of said surface containing said fourth point being disposed at an angle from a line parallel to said longitudinal axis and passing through said fourth point, said angle being measured in a counter clockwise direction about said circumference as viewed in said positive direction.

4. A form for supporting a saddle-shaped electrical coil comprising:
   (a) an annular supporting surface closed on itself and having a circumference large with respect to its width, said circumference being constant along lines at any given and constant distance in the width direction from a peripheral edge of said surface;
   (b) first, second, third, and fourth points successively and substantially equally spaced one from another along a circumference, the succession of said points defining a positive direction of said circumference, said supporting surface having a centrally located longitudinal axis surrounded by said circumference;

(c) a portion of said surface containing said first point being disposed at an angle from a line parallel to said longitudinal axis and passing through said first point, said angle being measured in a clockwise direction about said circumference as viewed in said positive direction;

(d) a portion of said surface containing said second point being disposed at an angle from a line parallel to said longitudinal axis and passing through said second point, said angle being measured in a counter clockwise direction about said circumference as viewed in said positive direction;

(e) a portion of said surface containing said third point being disposed at an angle from a line parallel to said longitudinal axis and passing through said third point, said angle being measured in a clockwise direction about said circumference as viewed in said positive direction; and (f) a portion of said surface containing said fourth point being disposed at an angle from a line parallel to said longitudinal axis and passing through said fourth point, said angle being measured in a counter clockwise direction about said circumference as viewed in said positive direction to provide a substantially continuous and smooth supporting surface having bends substantially only in single curvature.

5. A form for supporting a saddle-shaped electrical coil comprising:

(a) an annular supporting surface closed on itself and having a circumference large with respect to its width, said circumference being constant along lines at any given and constant distance in the width direction from a peripheral edge of said surface;

(b) first, second, third, and fourth points successively and substantially equally spaced one from another along a circumference, the succession of said points defining a positive direction of said circumference, said supporting surface having a centrally located longitudinal axis surrounded by said circumference and substantially normal to portions of said circumference at said points;

(c) a first portion of said surface containing said first point disposed at an angle from a line parallel to said longitudinal axis and passing through said first point, said angle being measured in a clockwise direction about said circumference as viewed in said positive direction;

(d) a second portion of said surface containing said second point being disposed at an angle from a line parallel to said longitudinal axis and passing through said second point, said angle being measured in a counter clockwise direction about said circumference as viewed in said positive direction;

(e) a third portion of said surface containing said third point being disposed at an angle from a line parallel to said longitudinal axis and passing through said third point, said angle being measured in a clockwise direction about said circumference as viewed in said positive direction;

(f) a fourth portion of said surface containing said fourth point being disposed at an angle from a line parallel to said longitudinal axis and passing through said fourth point, said angle being measured in a counter clockwise direction about said circumference as viewed in said positive direction; and (g) further portions of said surface having bends substantially only in single curvature connecting respectively said first, second, third, and fourth portions.

6. A form for supporting a saddle-shaped electrical coil comprising:

(a) an annular supporting surface closed on itself and having a circumference large with respect to its width, said circumference being constant along lines at any given and constant distance in the width direction from a peripheral edge of said surface;

(b) first, second, third, and fourth points successively and substantially equally spaced one from another along a circumference, the succession of said points defining a positive direction of said circumference, said supporting surface having a centrally located longitudinal axis surrounded by said circumference and substantially normal to portions of said circumference at said points;

(c) a first portion of said surface containing said first point being disposed at an angle from a line parallel to said longitudinal axis and passing through said first point, said angle being measured in a clockwise direction about said circumference as viewed in said positive direction;

(d) a second portion of said surface containing said second point being disposed at an angle from a line parallel to said longitudinal axis and passing through said second point, said angle being measured in a counter clockwise direction about said circumference as viewed in said positive direction;

(e) a third portion of said surface containing said third point being disposed at an angle from a line parallel to said longitudinal axis and passing through said third point, said angle being measured in a clockwise direction about said circumference as viewed in said positive direction;

(f) a fourth portion of said surface containing said fourth point being disposed at an angle from a line parallel to said longitudinal axis and passing through said fourth point, said angle being measured in a counter clockwise direction about said circumference as viewed in said positive direction; and (g) further portions of said surface connecting respectively said first, second, third, and fourth portions, all of said portions having bends in substantially only single curvature.

7. A form for supporting a saddle-shaped electrical coil comprising:

(a) an annular supporting surface closed on itself and having a circumference large with respect to its width, said circumference being constant along lines at any given and constant distance in the width direction from a peripheral edge of said surface;

(b) first, second, third, and fourth points successively and substantially equally spaced one from another along a circumference, the succession of said points defining a positive direction of said circumference, said supporting surface having a centrally located longitudinal axis surrounded by said circumference and substantially normal to portions of said circumference at said points;

(c) a first portion of said surface containing said first point being disposed at an angle from a line parallel to said longitudinal axis and passing through said first point, said angle being measured in a clockwise direction about said circumference as viewed in said positive direction;

(d) a second portion of said surface containing said second point being disposed at an angle from a line parallel to said longitudinal axis and passing through said second point, said angle being measured in a counter clockwise direction about said circumference as viewed in said positive direction;

(e) a third portion of said surface containing said third point being disposed at an angle from a line parallel to said longitudinal axis and passing through said third point, said angle being measured in a clockwise direction about said circumference as viewed in said positive direction;

(f) a fourth portion of said surface containing said fourth point being disposed at an angle from a line parallel to said longitudinal axis and passing through said fourth point, said angle being measured in a counter clockwise direction about said circumference as viewed in said positive direction; and (g) further portions of said surface disposed between and connecting respectively said aforementioned portions of said surface, each of said further portion having a generally conical configuration.

8. A form for supporting a saddle-shaped electrical coil comprising:

(a) an annular supporting surface closed on itself and having a circumference large with respect to its width, said circumference being constant along lines at any given and constant distance in the width direction from a peripheral edge of said surface as in the case of a cylinder;

(b) first, second, third, and fourth points successively and substantially equally spaced one from another along a circumference, the succession of said points defining a positive direction of said circumference, said supporting surface having a centrally located longitudinal axis surrounded by said circumference and substantially normal to portions of said circumference at said points as in the case of a cylinder;

(c) a first portion of said strip containing said first point disposed at an angle from a line parallel to said longitudinal axis and passing through said first point, said angle being measured in a clockwise direction about said circumference as viewed in said positive direction;

(d) a second portion of said strip containing said second point disposed at an angle from a line parallel to said longitudinal axis and passing through said second point, said angle being measured in a counter clockwise direction about said circumference as viewed in said positive direction;

(e) a third portion of said strip containing said third point disposed at an angle from a line parallel to said longitudinal axis and passing through said third point, said angle being measured in a clockwise direction about said circumference as viewed in said positive direction;

(f) a fourth portion of said strip containing said fourth point disposed at an angle from a line parallel to said longitudinal axis and passing through said fourth point, said angle being measured in a counter clockwise direction about said circumference as viewed in said positive direction; and (g) further portions disposed between and connecting respectively said aforementioned portions of said surface, each said further portion having a generally conical configuration and all of said portions having bends in substantially only single curvature.

9. The combination as defined in claim 8 wherein said surface forms part of a metallic strip of nonmagnetic material and a majority of said first and third portions substantially lie in the same plane.

10. The combination as defined in claim 9 wherein a majority of said second and fourth portions are substantially flat, a plane passing through each of said second and fourth portions defining an acute angle with a plane passing through said first and third portions.

References Cited by the Examiner
UNITED STATES PATENTS
2,719,252  9/1955  Margolis _____ 317—200

BERNARD A. GILHEANY, *Primary Examiner.*

G. HARRIS, JR., *Assistant Examiner.*